United States Patent [19]

Waggoner et al.

[11] Patent Number: 5,115,080

[45] Date of Patent: May 19, 1992

[54] THERMOTROPIC LIQUID CRYSTALLINE POLYESTERS FROM 2-METHYLHYDROQUINONE

[75] Inventors: Marion G. Waggoner, Hockessin; Michael R. Samuels, Wilmington, both of Del.

[73] Assignee: E. I. Du Pont de Nemours and Company, Wilmington, Del.

[21] Appl. No.: 602,853

[22] Filed: Oct. 24, 1990

[51] Int. Cl.$^5$ ............... C08G 63/00; C08G 63/02; C08K 3/40; C08J 67/00
[52] U.S. Cl. ................... 528/190; 523/527; 524/599; 524/601; 528/176; 528/193; 528/194
[58] Field of Search ............. 528/176, 190, 193, 194; 524/599, 601; 523/527

[56] References Cited

U.S. PATENT DOCUMENTS

| | | | |
|---|---|---|---|
| 4,093,595 | 6/1978 | Elliott | 260/47 C |
| 4,118,372 | 10/1978 | Schaefgen | 528/190 |
| 4,247,514 | 1/1981 | Luise | 264/345 |
| 4,342,862 | 8/1982 | Jackson, Jr. et al. | 528/176 |
| 4,536,562 | 8/1985 | Deex | 528/193 |

FOREIGN PATENT DOCUMENTS 53-036594 4/1978 Japan .
54-93041 7/1979 Japan .
54-138621 10/1979 Japan .

Primary Examiner—John Kight, III
Assistant Examiner—T. Mosley

[57] ABSTRACT

This invention relates to thermotropic liquid crystalline polyester compositions containing recurring units derived from 2-methylhydroquinone, terephthalic acid, 2,6-napthalenecarboxylic acid, and hydroquinone, characterized as having a heat distortion temperature of greater than 200° C. and improved elongation. The inclusion of a reinforcing/filling agent selected from the group consisting of glass reinforcing agents, glass fillers, carbon metasilicate, calcium carbonate, talc, titanium dioxide, and calcined aluminum silicate in said compositions, and also in those same compositions lacking recurring units of hydroquinone. results in an improvement in the elongation of said compositions. The inclusion of carbon fiber into these compositions results in no significant decrease in the elongation of said compositions. The compositions are useful as films, fibers, and shaped articles.

16 Claims, No Drawings

THERMOTROPIC LIQUID CRYSTALLINE POLYESTERS FROM 2-METHYLHYDROQUINONE

BACKGROUND

1. Technical Field

This invention relates to thermotropic liquid crystalline polyester compositions prepared from 2-methylhydroquinone, hydroquinone, terephthalic acid, and 2,6-naphthalenedicarboxylic acid and characterized as having a high heat distortion temperature (preferably greater than 200° C.) and improved elongation over those identical thermotropic liquid crystalline polyester compositions lacking hydroquinone. This invention further relates to thermotropic liquid crystalline polyester compositions prepared from 2-methylhydroquinone, terephthalic acid, and 2,6-naphthalenedicarboxylic acid, and optionally, hydroquinone, that further contain a reinforcing/filling component selected from the group consisting of glass reinforcing agents, glass fillers, calcium metasilicate, calcium carbonate, titanium dioxide, and calcined aluminum silicate, and that are characterized as having unexpectedly improved elongation in comparison to those identical thermotropic liquid crystalline polyester compositions lacking the reinforcing-/filling component. Further, it has been found that the inclusion of carbon fiber into said liquid crystalline polyester compositions prepared from 2-methylhydroquinone, terephthalic acid, 2,6-naphthalenedicarboxylic acid, and optionally, hydroquinone, does not significantly decrease the elongation of said compositions.

The thermotropic liquid crystalline polyester compositions of the present invention can be shaped into fibers, films, or molded articles and are useful in applications where it is desired to use a thermotropic liquid crystalline polyester composition having a high heat distortion temperature and/or improved elongation.

2. Background Art

Liquid crystalline polyesters are described in U.S. Pat. No. 4,118,372. Example 8 of this reference specifically illustrates the preparation of a liquid crystalline polyester from 2-methyl-1,4-phenylene diacetate (i.e., the diacetate of 2-methylhydroquinone), terephthalic acid, and 2,6-naphthalenedicarboxylic acid. However, there is no disclosure in the reference that the elongation of the liquid crystalline polyester composition of Example 8 therein can be improved by preparing said liquid crystalline polyester composition from the same components plus an additional component, i.e., hydroquinone. Further, there is no disclosure in this reference that the addition of a glass filler or glass reinforcing agent, or even other types of fillers or reinforcing agents and other ingredients, to the liquid crystalline polyester composition of Example 8 therein will increase the elongation property of said composition, as is found in the present invention. As such, although U.S. Pat. No. 4,118,372 provides background on liquid crystalline polyester compositions in general, it does not disclose the specific liquid crystalline polyester compositions of the present invention, nor does it disclose the particular advantages possessed by said compositions.

U.S. Pat. No. 4,093,595 discloses a process for polymerizing 2-methylhydroquinone, terephthalic acid, and 2,6-naphthalic acid (also referred to in the art as 2,6-naphthalenedicarboxylic acid) in the presence of a catalytic amount of a compound selected from the group consisting of antimony, tin, and titanium compounds.

Japanese Patent Application Kokai 54-138621 discloses a process for melt spinning a polyarylate which forms an anisotropic melt. Polyarylates comprised of 70 mole percent terephthalic acid, 30 mole percent naphthalene-2,6-dicarboxylic acid (also referred to in the art as 2,6-naphthalenedicarboxylic acid), and 100 mole percent 2-methylhydroquinone are exemplified.

Japanese Patent Application Publication 54-93041 discloses copolyesters of terephthalic acid, naphthalene-2,6-dicarboxylic acid (also referred to in the art as 2,6-naphthalenedicarboxylic acid), and 2-methylhydroquinone.

In none of the preceding references is it disclosed that the particular reinforcing/filling components useful herein may be added to the compositions described therein or that the addition of such a reinforcing/filling component results in an improvement in the elongation property of the compositions.

SUMMARY OF THE INVENTION

This invention relates to thermotropic liquid crystalline polyester compositions consisting essentially of recurring units of

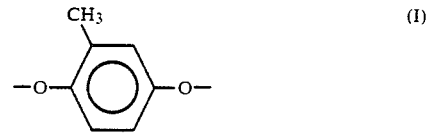

(I)

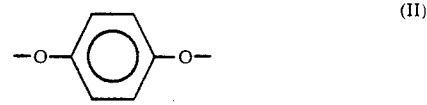

(II)

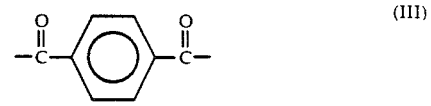

(III)

and

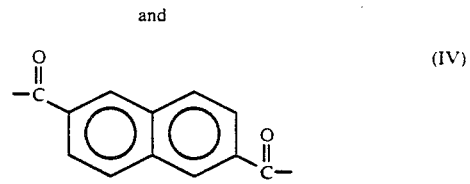

(IV)

wherein the molar ratio of (I):(II) ranges from 95:5 to 70:30, the ratio of (III):(IV) ranges from 75:25 to 30:70, and the molar ratio of the sum of (I) and (II) to the sum of (III) and (IV) is substantially 1:1. The compositions have a high heat distortion temperature (preferably greater than 200° C.). The compositions further have improved elongation over those identical compositions lacking the recurring unit of structure (II).

The elongation of said compositions, along with those thermotropic liquid crystalline polyester compositions wherein the ratio of (I):(II) ranges from 100:0 to 70:30, is further surprisingly improved by the inclusion therein of a reinforcing/filling component selected from the group consisting of glass reinforcing agents, glass fillers, calcium metasilicate, calcium carbonate, talc, titanium dioxide, and calcined aluminum silicate.

The elongation of said compositions, along with those thermotropic liquid crystalline polyester compositions wherein the ratio of (I):(II) ranges from 100:0 to 70:30, is further not significantly decreased by the inclusion therein of carbon fibers.

The compositions of the present invention can be formed into shaped articles such as fibers, films, and molded articles and are useful when improved heat distortion temperature and/or improved elongation properties in a thermotropic liquid crystalline polyester are desired.

DETAILED DESCRIPTION OF THE INVENTION

The present invention relates to certain thermotropic liquid crystalline polyester compositions characterized as having a high heat distortion temperature (preferably greater than 200° C.) and improved elongation, to certain thermotropic liquid crystalline polyester compositions that contain a reinforcing/filling component and that have improved elongation compared to those same compositions lacking the reinforcing/filling component, and to certain liquid crystalline polyester compositions containing carbon fiber and not experiencing a significant decrease in elongation as a result of the presence of the carbon fiber.

Thermotropic liquid crystalline polyester compositions are known in the art and are described by various terms, including "liquid crystal" and "anisotropic melts". Briefly, thermotropic liquid crystalline polyester compositions involve a parallel ordering of molecular chains in the melt. The molten state wherein molecules are of such a parallel order is often referred to as the liquid crystal state. Liquid crystalline polyesters are prepared from monomers which are generally long, flat, and fairly rigid along the axis of the molecule and have chain extending linkages that are either coaxial or parallel. Whether or not a polymer is in a liquid crystal state can be determined by known procedures for determining optical anisotropy. Such procedures are described in U.S. Pat. No. 4,118,372, column 5, lines 40-68 and columns 8-9, incorporated herein by reference.

Liquid crystalline polyester compositions are known to have exceptionally high mechanical properties compared to analogous polymers not having a liquid crystalline character. However, it continues to be desirous to develop liquid crystalline polyester compositions with improved mechanical properties, such as improved heat distortion temperature and improved elongation.

In the present invention, a thermotropic liquid crystalline polyester composition prepared from 2-methylhydroquinone, hydroquinone, terephthalic acid, and 2,6-naphthalenedicarboxylic acid has been developed that has improved elongation in comparison to a liquid crystalline polyester composition prepared from the same components but without the hydroquinone. It has further ben found that the inclusion of a reinforcing/filling component into liquid crystalline polyester compositions prepared from 2-methylhydroquinone, terephthalic acid, and 2,6-naphthalenedicarboxylic acid, and preferably also from hydroquinone, results in an unexpected improvement in the elongation property of said compositions.

I. The Thermotropic Liquid Crystal Polyester Compositions

Specifically, the thermotropic liquid crystalline polyester composition of the present invention consists essentially of recurring units derived from (a) 2-methylhydroquinone, having structure (I),

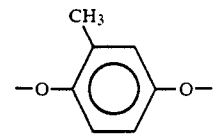

(b) hydroquinone, having structure (II),

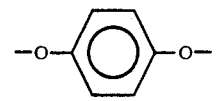

(c) terephthalic acid, having structure (III),

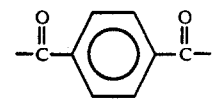

and (d) 2,6-naphthalenedicarboxylic acid, having structure (IV),

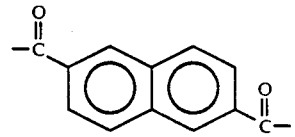

wherein the molar ratio of (I):(II) is from 100:0 to 70:30, preferably from 95:5 to 70:30, more preferably from 90:10 to 75:25, and most preferably from 85:15 to 80:20, wherein the molar ratio of (III):(IV) is from 75:25 to 30:70, preferably from 74:26 to 50:50, and most preferably from 73:27 to 60:40, and further wherein the molar ratio of the total of (I) and (II) to the total of (III) and (IV) is substantially 1:1, preferably 0.95-1.05:1.00. These compositions are characterized as having a heat distortion temperature of greater than 200° C. Compositions containing recurring units derived from structure (II) (i.e., hydroquinone) are found to have improved elongation over those compositions that are identical except that they lack recurring units derived from structure (II).

The present invention further relates to the compositions described in the immediately preceding paragraph and further containing 10 to 60 weight percent, preferably 15 to 60 weight percent, and most preferably 15 to 45 weight percent of a reinforcing/filling component selected from the group consisting of glass reinforcing agents, glass fillers, calcium metasilicate, calcium carbonate, talc, titanium dioxide, and calcined aluminum silicate, with said weight percent ranges being based upon the weight of the liquid crystalline polyester composition and the reinforcing/filling component only. These compositions containing a reinforcing/filling component are characterized as having surprisingly higher elongation values than those same compositions lacking the reinforcing/filling component. Such an improvement is surprising because reinforcing/filling components, such as, for example, glass, are generally known to have a negative effect on the elongation of polymers into which they are incorporated.

The components of the thermotropic liquid crystalline polyester compositions of the present invention (i.e., the 2-methylhydroquinone, the hydroquinone, the terephthalic acid, and the 2,6-naphthalenedicarboxylic acid) are known in the art and are commercially available or can be prepared by techniques readily available to those skilled in the art.

The reinforcing/filling components are known in the art and are commercially available or can be prepared by techniques readily available to those skilled in the art. As stated above, the reinforcing/filling component is selected from the group consisting of glass reinforcing agents, glass fillers, calcium metasilicate, calcium carbonate, talc, titanium dioxide, and calcined aluminum silicate. It is understood that each of the reinforcing/filling components may contain other substances and additives known to be present in such components. It is further mixtures of the reinforcing/filling components useful herein may be incorporated into the compositions of the present invention and improved elongation may result. However, use of certain mixtures of the reinforcing/filling components in said compositions may have a negative effect on the elongation of the compositions.

The thermotropic liquid crystalline polyester compositions of the present invention preferably have a flow temperature in the range of 200° C. to 375° C., preferably above 260° C., and a melt viscosity greater than 10 Pascal.seconds, preferably greater than 20 Pascal.seconds, measured at 335° C. and 1000 sec$^{-1}$ shear rate (as measured in a constant melt rheometer using ASTM-D 3835).

In addition, the thermotropic liquid crystalline polyester compositions described above, both those with and without recurring units of hydroquinone, can contain carbon fiber. Carbon fiber has been found not to decrease significantly the elongation of said thermotropic liquid crystalline polyester compositions. Such an effect is surprising because carbon fiber is known to have a significant negative effect on the elongation of many polymer compositions. Such compositions contain 10 to 60 weight percent, preferably 15 to 60 weight percent, and most preferably 15 to 45 weight percent carbon fiber, with said weight percent being based upon the weight of the liquid crystalline polyester and the carbon fiber.

In addition to the components described above, the thermotropic liquid crystalline polyester compositions of the present invention can contain other additives, ingredients, and modifiers known to be added to liquid crystalline polyester compositions, such as, but not limited to, fillers (other than those specifically referenced as a reinforcing/filling component), catalysts, nucleating agents, pigments, antioxidants, stabilizers, plasticizers, lubricants, tougheners, minerals, carbon black, and synergists.

II. Preparation of the Liquid Crystalline Polyester Compositions

The liquid crystalline polyester compositions of the present invention may be prepared from the appropriate monomer, or precursor thereof, by standard polycondensation techniques, preferably under anhydrous conditions and in an inert atmosphere. For example, equimolar amounts of acetic anhydride, the diol components (or optionally the diacetate derivative of the diol components), and the diacid components, and optionally up to 20 percent excess acetic anhydride, are combined in a reaction vessel equipped with a stirrer, nitro and combination distillation head condenser (to facilitate by-product removal). The reaction vessel and other equipment are dried and purged with nitrogen prior to use. The vessel and stirred contents, maintained under nitrogen, are heated during which time the reactants polymerize and any by-product formed (such as, for example, acetic acid) is removed via the distillation head condenser and is collected. When the polymerization appears nearly complete, as indicated by the amount of by-product collected remaining constant, the molten mass is placed under reduced pressure (e.g. 1 mm Hg(absolute) or less) and is heated to a higher temperature, to facilitate removal of any remaining by-product and to complete the polymerization. The melt may then be removed, cooled, and allowed to solidify prior to purification and/or subsequent processing, such as melt compounding the liquid crystalline polyester with a glass filler component and/or other additives. Melt compounding can be accomplished by any device capable of mixing the molten liquid crystalline polyester with other additives, such as glass. A preferred device is an extruder, either single or twin screw. The twin screw extruder may be either co-rotating or counter-rotating. Optionally, the molten polymer may be transferred directly to an appropriate apparatus, such as a melt extruder and/or injection molding machine or spinning unit, for the preparation of shaped articles, such as molded articles, fibers, films, monofilaments, and bars. Shaped articles prepared from the compositions of the present invention may further be heat treated in accordance with U.S. Pat. No. 4,247,514 (Luise), incorporated herein by reference. By the process described in U.S. Pat. No. 4,247,514, shaped articles prepared, from a liquid crystalline polymer are treated from above 140° C. to below the flow temperature of the polymer from which it was prepared for a period of time sufficient to increase energy to break in flexure by at least 25% in at least one direction of measurement. Further details on this process can be found in U.S. Pat. No. 4,247,514.

Polymerization conditions may be varied according to, e.g., the reactants employed and the degree of polymerization desired.

EXAMPLES

In the following Examples, there are shown specific embodiments of the present invention, along with embodiments outside the literal scope of the present invention that are included for comparative purposes.

In the Examples below, the following components were used:

(1) "MeHQ" was 2-methylhydroquinone, (2) "HQ" was hydroquinone, (3) "T" was terephthalic acid, (4) "2,6N" was 2,6-naphthalenedicarboxylic acid, (5) "Glass" was a commercially available fiber glass having an average fiber length of ⅛ inch, as determined by standard rule, calibrated to 1/16 inch, (6) "Talc" was a commercially available talc filling agent, (7) "CMS" was a calcium metasilicate mineral (tradename: Wollastonite ®), (8) "CaCO$_3$" was a commercially available calcium carbonate, (9) "CF" was a commercially available carbon fiber derived from polyacrylonitrile,

(10) "TiO$_2$" was a commercially available anatase titanium dioxide, and

(11) "AlS" was a commercially available calcined aluminum silicate.

Synthesis of Liquid Crystalline Polyesters used in the Examples

The liquid crystalline polyesters ("LCP") used in the Examples below were prepared as follows:

(1) LCP-1 from MeHO-T/2,6N (100-70/30)

"LCP-1" was a bag blend mixture of three batches of a thermotropic liquid crystalline polyester composition prepared from MeHQ, T, and 2,6N. Each batch was prepared substantially as follows: 392 grams of MeHQ, 367 grams of T, and 205 grams of 2,6N, along with 741 grams of acetic anhydride were charged, in a nitrogen atmosphere into a reaction vessel equipped with a Vigreux column, condenser, and a stirrer (stir speed set at 125 rpm) and heating the resultant reaction mixture to reflux. Reflux began at a pot temperature of 154° C. The reaction mixture was refluxed for about 40 minutes, at constant temperature. During the next 40 minutes the pot temperature was slowly raised to about 228° C., at which point vacuum was applied to reduce the pressure to about 660 mm Hg(abs.). The reaction mixture was further heated and refluxed under a pressure of about 660 mm Hg(abs) for approximately 80 minutes after vacuum was first applied. During that time, acetic acid by-product was collected and the pot temperature increased to about 335° C. The pressure was then reduced over the next hour to 0.02 mm Hg (abs) while the stirrer speed was gradually reduced to 20 rpm and the pot temperature was maintained at about 338° C. The polymerization reaction was terminated approximately 4 hours after the components were initially charged into the reaction vessel. Approximately 750 grams of product were recovered.

(2) LCP-2a and LCP-2b from MeHQ/HQ-T/2,6N (80/20-70/30)

"LCP-2a" and "LCP-2b" were each prepared in a similar manner to that described for LCP-1. Specifically, LCP-2a and LCP-2b were prepared by charging, in a nitrogen atmosphere, 276 grams of MeHQ, 43 grams of HQ, 305 grams of T, and 170 grams of 2,6N, along with 615 grams of acetic anhydride, into a reaction vessel equipped with a Vigreux column, condenser, and stirrer (stir speed set at 125 rpm) and heating the resultant reaction mixture to reflux. Reflux began at a pot temperature of 145° C. The reaction mixture was refluxed for about 45 minutes, during which time the pot temperature was held constant. The pot temperature was then slowly raised over the next 40 minutes to about 218° C., at which point vacuum was applied to reduce the pressure to 660 mm Hg(abs). The reaction mixture was further heated and refluxed at a pressure of 640–660 mm Hg(abs) for approximately 70 minutes after vacuum was first applied. At the end of the time period, the pot temperature was about 333° C. The pressure was then reduced over the next approximately 80 minutes while simultaneously reducing the stirrer speed to 20 rpm and maintaining the pot temperature at about 337° C. The polymerization reaction was terminated approximately 6 hours after the components were initially charged into the reaction vessel. There was recovered 600 grams of LCP-2.

(3) LCP-3 from MeHO/HO-T/2,6N (80/20-65/35)

"LCP-3" was prepared in a manner similar to that described for LCP-1. Specifically, LCP-3 was prepared by charging, in a nitrogen atmosphere, 309.4 grams of MeHO, 68.3 grams of HQ, 334.8 grams of T, and 234.6 grams of 2,6N, along with 667 grams of acetic anhydride, into a reaction vessel equipped with a Vigreux column, condenser, and a stirrer (stir speed set at 150 rpm) and heating the resultant reaction mixture to reflux. The reaction was refluxed for about 60 minutes, during which time the pot temperature was held constant at 170° C. The pot temperature was then slowly raised over the next approximately 240 minutes to about 330° C., at which point vacuum was applied to reduce the pressure to 100 mm Hg (abs). The pressure was then reduced over the next approximately 180 minutes while reducing the stirrer speed to 30 rpm and maintaining the pot temperature at about 330° C. The polymerization reaction was terminated approximately 7 hours after the components were initially charged into the reaction vessel. Approximately 725 grams of product were recovered.

Compounding of the LCP and Molding Test Bars

Unless otherwise specified, compounding of LCP compositions with any other component was done in a 28 mm Werner and Pfleiderer twin-screw extruder having a zone with conventional conveying elements, a zone with kneading or mixing elements, and a low pressure zone with venting under vacuum of any volatiles from the polymer melt, and a die. As the compounded LCP compositions exited the die, they were quenched with a water spray and cut into pellets with a conventional strand cutter. The extruder barrel and die temperatures were maintained at about 290° C. and 300°–320° C., respectively. Prior to molding the pellets, the pellets were dried overnight for approximately 16 hours in a vacuum oven with $N_2$ purge at 100°–130° C. The dried polymer pellets were molded into standard test bars, as required per ASTM D638 for determining tensile properties, on either a 1½ oz Arburg molding machine or a 6 oz HPM molding machine with barrel temperatures of 330°–340° C. and injection pressures of 4000–6000 psi.

Tests

The LCP compositions of the Examples below were tested to determine glass transition temperature ($T_g$), melting temperature ($T_m$), breaking elongation, tensile strength, and heat distortion temperature (HDT).

Tg and Tm were determined using a 25° C./minute heating rate with a Du Pont Model 1090 Dual Sample Differential Scanning Calorimeter by ASTM D2117. Tensile strength and elongation at break were determined in accordance with ASTM D638. HDT was determined in accordance with ASTM D648.

CONTROL EXAMPLE 1 AND EXAMPLES 1-2

The compositions of Control Example 1 and Examples 1-2, along with the test results for said compositions, are detailed in TABLE I, below.

The breaking elongation of the MeHQ-T/2,6N LCP-1 composition was greater with Glass included therein (Example 1) than without Glass included therein (Control Example 1). Specifically, when Glass was incorporated into the MeHQ-T/2,6N composition of Control Example 1, breaking elongation was improved from 1.4% to 1.9%.

Similarly, the breaking elongation of the MeHQ-T/2,6N LCP-1 composition was greater with Talc included therein (Example 2) than without Talc included therein (Control Example 1). Specifically, when Talc was incorporated into the MeHQ-T/2,6N composition of Control Example 1, breaking elongation was improved from 1.4% to 2.6%.

TABLE I

| Example | Control 1 | 1 | 2 |
|---|---|---|---|
| LCP Components | LCP-1 MeHQ-T/2,6N | LCP-1 MeHQ-T/2,6N | LCP-1 MeHQ-T/2,6N |
| Ratio of Components | 100– 70/30 | 100– 70/30 | 100– 70/30 |
| Wt % Reinforcing/Filling Component | — | 30 Glass | 30 Talc |
| $T_g$ (°C.) | 118 | 118 | 118 |
| $T_m$ (°C.) | 321 | 321 | 321 |
| Breaking Elongation (%) | 1.4 | 1.9 | 2.6 |
| Tensile Strength (kpsi) | 19.6 | 22.2 | 21.7 |
| HDT (°C.) | 221 | 248 | 219 |

CONTROL EXAMPLE 1 AND EXAMPLES 3–7

The compositions of Control Example 1 and Examples 3–7, along with the test results for said compositions, are detailed in TABLE II, below.

The LCP-2 prepared from MeHQ/HQ-T/2,6N (Example 3) had a higher breaking elongation than did the LCP-1 prepared from only MeHQ-T/2,6N (Control Example 1). Specifically, the LCP-2 composition of Control Example 1 had a breaking elongation of 1.4% while the LCP-2 composition of Example 3 (the present invention) had a breaking elongation of 1.8%.

The breaking elongation of the MeHQ/HQ-T/2,6N composition of Example 3 was improved from 1.8% to 2.6% (Example 4) when Glass was incorporated therein. Similarly, the breaking elongation of the MeHQ/HQ-T/2,6N composition was also improved when TiO2 was incorporated therein (Example 5) and when AlS was incorporated therein (Example 6).

Example 7 showed that the breaking elongation of LCP-2 (i.e., Example 2) was unaffected by the inclusion therein of carbon fiber.

TABLE II

| Example | Control 1 | 3 | 4 | 5 | 6 | 7 |
|---|---|---|---|---|---|---|
| LCP Components | LCP-1 MeHQ-T/2,6N | LCP-2a MeHQ/HQ-T/2,6N | LCP-2a MeHQ/HQ-T/2,6N | LCP-2b MeHQ/HQ-T/2,6N | LCP-2b MeHQ/HQ-T/2,6N | LCP-2b MeHQ/HQ-T/2,6N |
| Ratio of Components | 100–70/30 | 85/15–70/30 | 85/15–70/30 | 85/15–70/30 | 85/15–70/30 | 85/15–70/30 |
| Wt % Reinforcing/Filling Component | — | — | 30 Glass | 30 TiO$_2$ | 30 AlS | — |
| Wt % Carbon Fiber | — | — | — | — | — | 20 |
| $T_g$ (°C.) | 118 | 117 | 117 | 117 | 117 | 117 |
| $T_m$ (°C.) | 321 | 320 360 | 320 360 | 320 360 | 320 360 | 320 360 |
| Breaking Elongation (%) | 1.4 | 1.8 | 2.6 | 2.0 | 2.2 | 1.8 |
| Tensile Strength (kpsi) | 19.6 | 23.6 | 25.6 | 19.1 | 22.6 | 24.0 |
| HDT (°C.) | 221 | 218 | 251 | 202 | 215 | 234 |

EXAMPLES 8–10

The compositions of Examples 8–10, along with the test results for said compositions, are detailed in TABLE III, below.

The breaking elongation of the MeHQ/HQ-T/2,6N composition of Example 8 was improved when Talc was incorporated therein (Example 9) and when CaCO$_3$ was incorporated therein (Example 10).

TABLE III

| Example | 8 | 9 | 10 |
|---|---|---|---|
| LCP Components | LCP-3 MeHQ/HQ-T/2,6N | LCP-3 MeHQ/HQ-T/2,6N | LCP-3 MeHQ/HQ-T/2,6N |
| Ratio of Components | 80/20–65/35 | 80/20–65/35 | 80/20–65/35 |
| Wt % Reinforcing/Filling Component | — | 30 Talc | 30 CaCO$_3$ |
| $T_g$ (°C.) | 117 | 117 | 117 |
| $T_m$ (°C.) | 321 | 321 | 321 |
| Breaking Elongation (%) | 3.3 | 3.6 | 3.7 |
| Tensile Strength (kspi) | 16.6 | 20.9 | 18.5 |
| HDT (°C.) | 221 | 236 | 222 |

We claim:
1. A thermotropic liquid crystalline polyester composition consisting essentially of recurring units of
(a) structure (I),

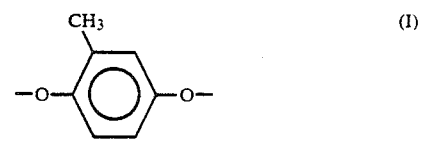

(b) structure (II), (c) structure (III),

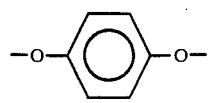

and
(d) structure (IV),

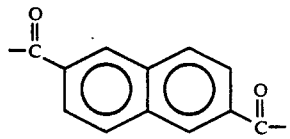

wherein the molar ratio of (I):(II) ranges from 95:5 to 70:30, wherein the molar ratio of (III):(IV) ranges from 75:25 to 30:70, and further wherein the molar ratio of the total of (I) and (II) to the total of (III) and (IV) is substantially 1:1.

2. The composition of claim 1 wherein the molar ratio of (I):(II) ranges from 90:10 to 75:25 and the molar ratio of (III):(IV) ranges from 74:26 to 50:50.

3. The composition of claim 1 wherein the molar ratio of (I):(II) ranges from 85:15 to 80:20 and the molar ratio of (III):(IV) ranges from 73:27 to 60:40.

4. The composition of claims 1, 2, or 3 wherein the molar ratio of the total of (I) and (II) to the total of (III) and (IV) is 0.95–1.05:1.00.

5. A thermotropic liquid crystalline polyester composition consisting essentially of
(a) 90 to 40 weight percent of a liquid crystalline polyester consisting essentially of recurring units of
(i) structure (I),

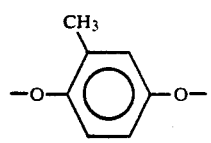

(ii) structure (II),

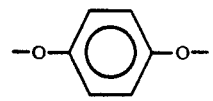

(iii) structure (III),

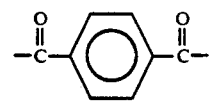

and
(iv) structure (IV),

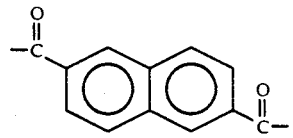

wherein the molar ratio of (I):(II) ranges from 100:0 to 70:30, wherein the molar ratio of (III):(IV) ranges from 75:25 to 30:70, and further wherein the molar ratio of the total of (I) and (II) to the total of (III) and (IV) is substantially 1:1 and (b) 10 to 60 weight percent of a reinforcing/filling agent selected from the group consisting of glass reinforcing agents, glass fillers, calcium carbonate, talc, titanium dioxide, calcined aluminum silicate, wherein the weight percents given are based upon the total of components (a) and (b) only.

6. The composition of claim 5 wherein the molar ratio of (I):(II) ranges from 95:5 to 70:30.

7. The composition of claim 5 wherein the molar ratio of (I):(II) ranges from 90:10 to 75:25 and the molar ratio of (III):(IV) ranges from 74:26 to 50:50.

8. The composition of claim 5 wherein the molar ratio of (I):(II) ranges from 85:15 to 80:20 and the molar ratio of (III):(IV) ranges from 73:27 to 60:40.

9. The composition of claims 5, 6, 7, or 8 wherein the molar ratio of the total of (I) and (II) to the molar ratio of the total of (III) and (IV) is 0.95–1.05:1.00.

10. The composition of claims 1 or 5 wherein the liquid crystalline polyester has a melt viscosity of greater than 40 Pascal seconds.

11. A thermotropic liquid crystalline polyester composition consisting essentially of
(a) 90 to 40 weight of a liquid crystalline polyester consisting essentially of recurring units of
(i) structure (I),

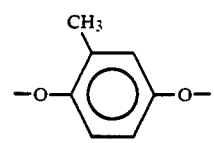

(ii) structure (II),

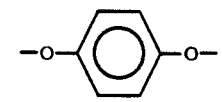

(iii) structure (III),

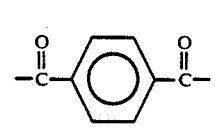

and
(iv) structure (IV),

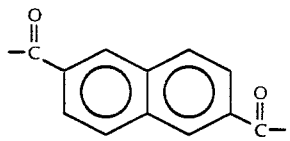 (IV)

wherein the molar ratio of (I):(II) ranges from 100:0 to 70:30, wherein the molar ratio of (III):(IV) ranges from 75:25 to 30:70, and further wherein the total of (I) and (II) to the total of (III) to (IV) is substantially 1:1 and (b) 10 to 60 weight percent of carbon fiber, wherein the weight percents given are based upon the total of components (a) and (b) only.

12. The composition of claim 1 further comprised of at least one of fillers, nucleating agents, pigments, carbon fiber, antioxidants, stabilizers, plasticizers, lubricants, tougheners, minerals, carbon black, synergists, and fire retardants.

13. The composition of claim 5 further comprised of at least one of additional ingredients selected from fillers, nucleating agents, pigments, carbon fiber, antioxidants, stabilizers, plasticizers, lubricants, tougheners, minerals, carbon black, synergists, and fire retardants and synergists wherein said additional ingredients do not include the compounds of component (b).

14. Shaped articles made from the composition of claims 1 or 5.

15. A shaped article of claim 14 selected from the group consisting of molded articles, films, monofilaments, and fibers.

16. A shaped article of claim 14 that is heat treated at a temperature from above 140° C. to below the flow temperature of the polymer from which the shaped article is prepared for a period of time sufficient to increase energy to break in flexure by at least 25% in at least one direction of measurement.

* * * * *

UNITED STATES PATENT AND TRADEMARK OFFICE
CERTIFICATE OF CORRECTION

PATENT NO. : 5,115,080
DATED : MAY 19, 1992
INVENTOR(S) : MARION GLEN WAGGONER
MICHAEL ROBERT SAMUELS

It is certified that error appears in the above-identified patent and that said Letters Patent is hereby corrected as shown below:

In column 8, line 53, delete "2117" and insert in place thereof --D3418-82 (measured on the first heat)--.

Signed and Sealed this

Twelfth Day of October, 1993

Attest:

BRUCE LEHMAN

Attesting Officer    Commissioner of Patents and Trademarks